United States Patent [19]
de Savasse

[11] Patent Number: 6,018,234
[45] Date of Patent: Jan. 25, 2000

[54] REGULATING SYSTEM FOR AN ALTERNATOR VOLTAGE

[75] Inventor: Antoine de Monts de Savasse, Cambremer, France

[73] Assignee: Valeo Equipment Electriques Moteur, Creteil, France

[21] Appl. No.: 08/931,730

[22] Filed: Sep. 16, 1997

[30] Foreign Application Priority Data

Sep. 16, 1996 [FR] France .................................. 9611253

[51] Int. Cl.⁷ .................................................. H02J 7/14
[52] U.S. Cl. ............................ 322/33; 322/28; 320/153
[58] Field of Search ................................. 322/33, 34, 81, 322/28; 320/150, 151, 152, 153

[56] References Cited

U.S. PATENT DOCUMENTS

| | | | |
|---|---|---|---|
| 4,398,140 | 8/1983 | Morishita | 320/36 |
| 5,089,762 | 2/1992 | Sloan | 320/13 |
| 5,307,001 | 4/1994 | Heavey | 320/30 |
| 5,374,886 | 12/1994 | Kohl et al. | 322/28 |
| 5,548,202 | 8/1996 | Schramm et al. | 322/33 |
| 5,570,001 | 10/1996 | Fenley | 322/36 |
| 5,659,240 | 8/1997 | King | 320/30 |

FOREIGN PATENT DOCUMENTS

| | | |
|---|---|---|
| 0 335 085 | 10/1989 | European Pat. Off. . |
| 2 572 860 | 5/1986 | France . |

*Primary Examiner*—Nicholas Ponomarenko
*Attorney, Agent, or Firm*—Morgan & Finnegan, LLP

[57] ABSTRACT

A system for regulating the output voltage of an alternator of a vehicle, supplying power to the electrical system of the vehicle and charging the battery, includes a regulator which controls the excitation current of the alternator. The regulator regulates the output voltage of the alternator with respect to a reference voltage which does not vary as a function of temperature. The system also includes a module in which a temperature sensor measures the battery temperature. This module supplies to the regulator an input signal which is a function of the battery voltage and of the measured battery temperature. The regulator maintains this input voltage at a constant value, and the module is such that this regulation causes the battery voltage to vary in accordance with a required regulation law.

18 Claims, 2 Drawing Sheets

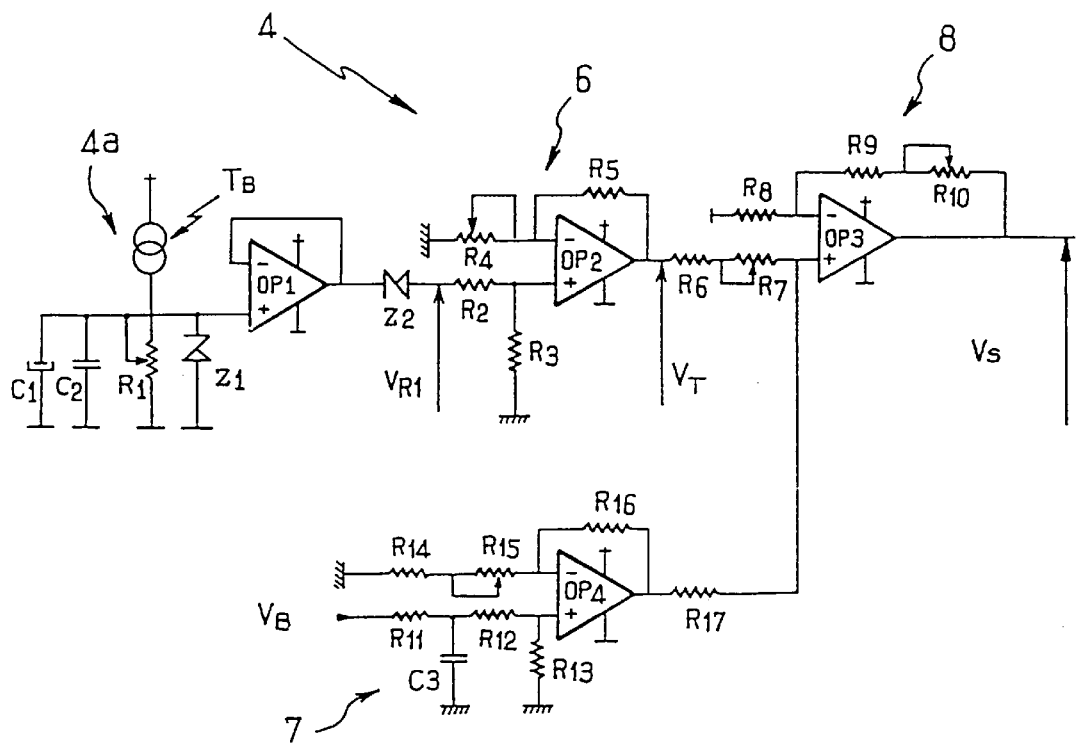
FIG_4
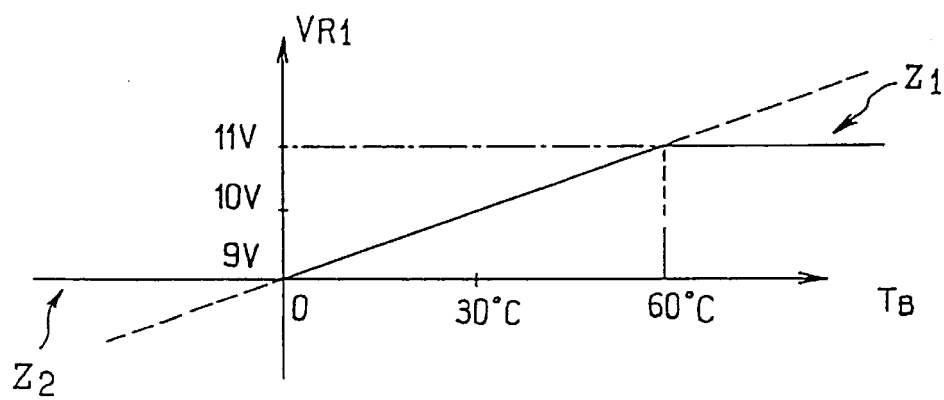
FIG_5

REGULATING SYSTEM FOR AN ALTERNATOR VOLTAGE

FIELD OF THE INVENTION

The present invention relates to systems for regulating the output voltage of an alternator.

BACKGROUND OF THE INVENTION

In the context of a vehicle having a heat engine, the function of an alternator is conventionally to supply power to the wiring network of the vehicle and to recharge the battery of the vehicle when the engine is running. However, limitations are placed on the value of the voltage delivered by the alternator, and by the wiring system itself and the battery of the vehicle. In this regard, the output voltage of the alternator must generally vary as a function of temperature, for example according to a law similar to that illustrated in the curve shown in FIG. 1 of the accompanying drawings. FIG. 1 shows the ideal charging profile as a function of temperature, for a lead-acid battery.

In the example illustrated in FIG. 1, the optimum charge of the battery makes it necessary for the charging voltage to vary in a linear manner as a function of temperature over a straight line D having a negative slope (for example −33 mV/° C.). It will be noted that the charging current undergoes severe variation once the charging voltage departs from this optimum line. It is therefore important that the charging voltage should follow this optimum line extremely closely.

In addition, the voltage delivered at the output of the alternator is limited to an upper value which is generally on the order of 15 to 16 volts, being 15.2 volts in the example shown in FIG. 1. This limitation is imposed in particular by the lighting equipment where this equipment makes use of filament bulbs. The alternator output voltage is further limited to a lower value, in the region of 13 volts, by the electromotive force of the battery when the latter is discharged.

Generally, in order to obtain regulation of this type, regulators are used which act on the excitation of the alternator as a function, firstly, of the temperature measured by a temperature sensor which is incorporated in the regulator of the alternator, and secondly, of the output voltage of the alternator or the charging voltage of the battery.

This way of achieving regulation is inexpensive, but from a technical point of view is not at all precise. In this regard, the alternator and the battery are separate components, situated in different places within the vehicle, and the variation in temperature of the battery is very slow, while that of the alternator (and therefore also of the regulator) is very rapid.

In order to be able to regulate the charging voltage of the battery correctly, it is desirable to know precisely the temperature of the battery. However, this is not the case with conventional regulators, which make use of the temperature measured directly on the alternator. In addition, regulators which make use of measurement of battery temperature, are expensive at the present time.

DISCUSSION OF THE INVENTION

An object the present invention is to overcome the above problem and to propose a regulating system of novel construction which enables the voltage delivered by an alternator to be regulated as a function of the temperature of the battery.

According to the invention, there is provided a system for regulating the output voltage of an alternator for supplying power to the electrical system on board a vehicle, and to charge a battery. The regulating system comprises a regulator which controls the excitation current of the alternator, and is characterized in that the regulator regulates the output voltage of the alternator with respect to a reference voltage which does not vary a function of temperature. The system further comprises a temperature sensor module including a temperature sensor, for measuring the temperature of the battery and for delivering to the input of the regulator an input voltage which is a function of the voltage of the battery and of the measurement of the temperature effected by the sensor. The regulator causes the alternator to adjust the battery voltage so that the output voltage of the module is maintained to substantially coincide with a reference voltage. This regulation causes the battery voltage to vary in accordance to the regulating laws.

As is understood, such a system can make use of an inexpensive standard type of regulator having a zero temperature compensation.

In addition, the regulation obtained in the system according to the invention is particularly reliable because it takes into account the measurement of the battery temperature.

Further features and advantages of the invention will appear become clearer upon reading of the following detailed description of some preferred embodiments of the invention, which is given by way of non-limiting example and with reference to the accompanying drawings.

BRIEF DESCRIPTION OF THE DRAWINGS

FIG. 4 is a circuit diagram showing one arrangement for the sensor module in the system of FIG. 2.

FIG. 5 shows the curve of the voltage at the output of the sensor circuit in the module of FIG. 4.

DESCRIPTION OF PREFERRED EMBODIMENTS OF THE INVENTION

Figure 1:
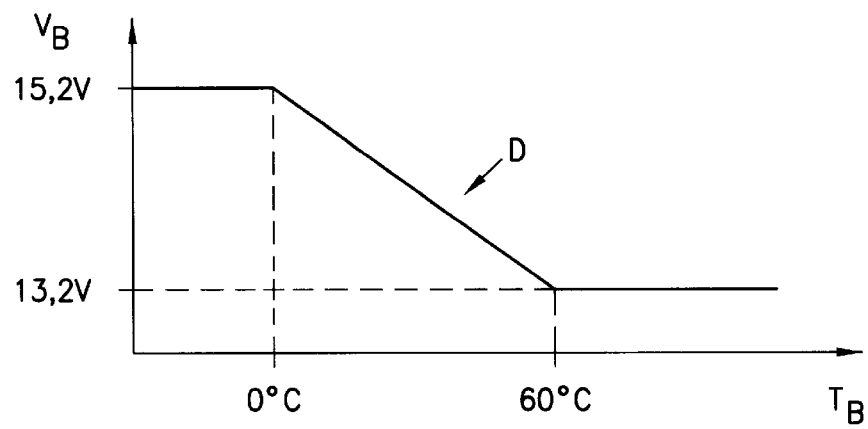
FIG. 1, already referred to above, is a graph showing the curve of the charging voltage of a battery as a function of temperature, in the particular case of a lead-acid battery.
Figure 2:
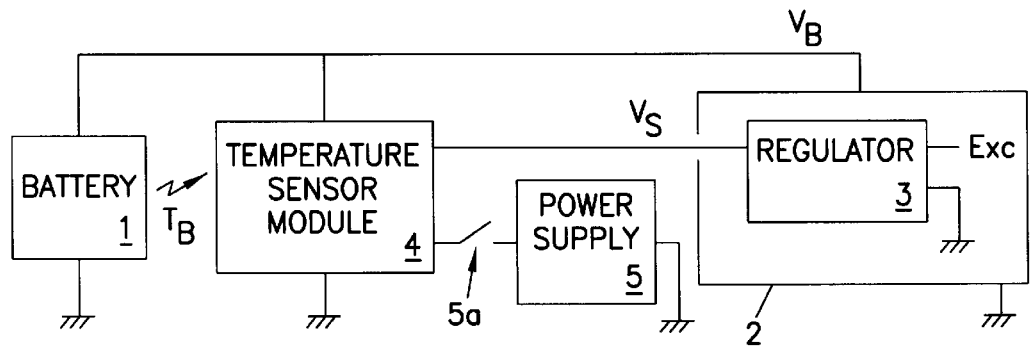
FIG. 2 is a block diagram of a regulating system in one possible embodiment of the invention.

FIG. 2 shows diagrammatically a battery 1 of a motor vehicle, and its alternator 2 which delivers a charging voltage $V_B$ to the battery 1. The regulating system in the circuitry of FIG. 2 comprises a standard regulator 3 together with a module 4, which includes a sensor for measuring the temperature of the battery 1.

FIG. 2 also shows a unit 5 for supplying power to the temperature sensor in the module 4, together with an interrupter 5a for controlling this supply of power.

The temperature sensor module 4 transmits to the input of the regulator 3 a voltage $V_S$, which is a linear combination of the voltage of the battery and a voltage $V_T$ which represents the temperature of the battery. Thus:

$$V_S = K_1 V_B + K_2 V_T \qquad (1)$$

where $K_1$ and $K_2$ are gains in the circuit of the module 4.

The regulator 3 is programmed in such a way that its thermal compensation is zero. It acts on the excitation Exc of the rotor of the alternator in such a way as to maintain its input voltage $V_S$ at a constant level, for example at a level of 14.2 volts ±150 mV, which is a regulating voltage commonly used at 25° C.

Since, from (1), the battery voltage $V_B$ at the output of the alternator 2 is $$V_B = (V_S - K_2 V_T)/K_1 \qquad (2)$$

The circuitry of the temperature sensor in the module 4 is such that the law whereby the output voltage $V_T$ varies as a function of temperature enables the required regulation for the alternator output voltage $V_B$ to be obtained.

Consequently, the temperature sensor circuit must have a transfer function $g(V_B, T_B)$, such that if $f(V_B, T_B)$ is the transfer function to be obtained, i.e.

$$f(V_B, T_B) o g(V_B, T_B) = V_S \qquad (3)$$

where $T_B$ is the temperature of the battery measured by the sensor and o represents the operation of convolution.

Figure 3:
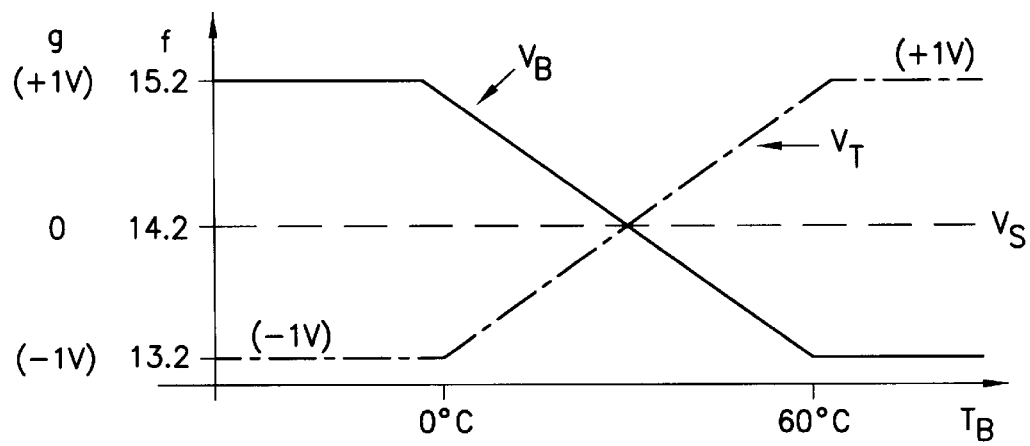
FIG. 3 is a graph similar to that in FIG. 1, which shows, besides the curve of charging voltage, firstly the input voltage $V_S$ delivered to the input of the regulator in FIG. 2, and secondly the curve of the output voltage $V_T$ of the temperature sensor in the system of FIG. 2.

FIG. 3 shows the curve of the charging voltage $V_B$ which corresponds to the required transfer function $f(V_B, T_B)$, together with the voltage Vs and a curve $V_T$ which corresponds to a transfer function $g(V_B, T_B)$ which enables equation (3) to be verified. As shown in FIG. 3, the voltage $V_T$ varies in a linear manner between the same values of battery temperature $T_B$ as does the voltage $V_B$, i.e. from 0 to 60° C. $V_T$ increases as a function of temperature from a lower threshold of −1 V to an upper threshold of +1 V.

The regulator 3 is for example a series mono-function regulator of the type such as those sold under the reference YV77 by the company Valeo Equipements Electriques Moteur.

It will also be noted that when the ignition switch of the vehicle is closed by operation of the ignition key, the interrupter 5a remains open so long as the heat engine of the vehicle has not been started to the point at which the charging voltage of the battery is itself high enough for the voltage $V_S$ to reach its nominal value.

Reference is now made to FIG. 4, which shows in detail one example of a possible circuit arrangement for the temperature sensor module 4. The module 4 shown in FIG. 4 includes a temperature sensor 4a which delivers a current having an intensity which increases in a linear manner as a function of temperature.

The temperature sensor 4a may for example be a temperature sensor of the type sold by the Analog Device Company under the reference AD 590 JH. This type of sensor behaves as a source of current of 1 $\mu A/° K.$, designed to operate between −55° C. and +150° C., with a relative error of ±0.5° C. over this range. Such sensors are capable of being supplied with a voltage between 4 and 30 volts. In the present example, the power supply unit 5 consists of two 9 volt batteries.

The temperature sensor 4a is connected between a power supply terminal supplying the voltage from the output of the power supply unit 5 and a circuit which comprises four branches connected to ground (earth) in parallel, namely one branch which consists of a resistor $R_1$, a second branch consisting of a Zener diode $Z_1$, and two further branches comprising capacitors $C_1$, $C_2$ respectively. The diode $Z_1$ is connected in the passing sense from ground towards the temperature sensor 4a.

The voltage at the common node of these various branches with the temperature sensor 4a is passed to the non-inverting input of an operational amplifier $OP_1$ which is connected as a voltage follower. The output of this amplifier $OP_1$ is injected into an amplifier stage 6, through another Zener diode $Z_2$, which is connected so as to be passing in the direction from the amplifier stage 6 towards the output of the operational amplifier $OP_1$.

As can be seen in FIG. 5, with such a circuit, the voltage $VR_1$ which is passed to the input of the amplifier stage 6 is proportional to the current from the source consisting of the temperature sensor 4a. It therefore increases in a linear manner as a function of temperature. As to the Zener diode $Z_1$, this limits the voltage $VR_1$ to an upper threshold value, while the second Zener diode $Z_2$ limits the same voltage to a lower threshold value.

If for example the resistor $R_1$ has a value of 33 K$\Omega$, this input voltage is 9 volts for a battery temperature of 0° C., and 11 volts for a battery temperature of 60° C. In practice, the resistor $R_1$ preferably has a variable value as shown in FIG. 4, so as to enable the slope of the variation in its voltage as a function of temperature to be adjusted.

The capacitors $C_1$ and $C_2$ act as filters and stabilize the first stage of the module 4.

The Zener diode $Z_1$ may for example typically have a Zener voltage of 11 volts, with the other Zener diode $Z_2$ having a Zener voltage of 9 volts. The capacitance of the capacitors $C_1$ and $C_2$ are for example 22 nf and 10 $\mu f$ respectively.

The voltage $V_t$ at the output of the amplifier stage 6 is passed to one of the inputs of an adder stage 8, in which it is added to a voltage corresponding to the voltage $V_B$ which has previously been amplified by a further amplifier stage 7.

The amplifier stage 6, the amplifier stage 7 and the adder stage 8 will now be described.

The amplifier stage 6 comprises an operational amplifier $OP_2$, the non-inverting input of which is connected firstly to the Zener diode $Z_2$ through a resistor $R_2$ of 510 $\Omega$, and secondly to ground through a resistor $R_3$ of 1,000 $\Omega$. The output of the operational amplifier $OP_2$ is connected to its inverting input through a further resistor $R_5$ of 100 K$\Omega$. This inverting input is also connected to ground through a resistance $R_4$ which is variable between 12 and 22 K$\Omega$.

The amplifier circuit 7 includes an operational amplifier $OP_4$, the non-inverting input of which receives the voltage $V_B$ through a resistor $R_{11}$ of 33 K$\Omega$. The end of this resistor $R_{11}$ which is opposite to that through which the voltage $V_B$ is injected is connected to ground through a capacitor $C_3$ of 47 nF, and to a further resistor $R_{12}$ of 680 K$\Omega$, the other end of which is connected to the non-inverting input of the operational amplifier $OP_4$. This non-inverting input is also connected to ground through a resistor $R_{13}$ of 680 K$\Omega$. The inverting input of this operational amplifier $OP_4$ is connected to ground through resistor $R_{14}$ of 18 K$\Omega$, which is in series with a resistance $R_{15}$ that is variable between 0 and 20 K$\Omega$. It is connected to the output of the operational amplifier $OP_4$ through a resistor $R_{16}$ of 33 K$\Omega$.

The adder stage 8 includes an operational amplifier $OP_3$, the non-inverting input of which is connected to the output of the operational amplifier $OP_4$ through a resistor $R_{17}$ of 9.1 K$\Omega$, and secondly to the output of the operational amplifier $OP_2$ through a resistor $R_6$ of 27 K$\Omega$ in series with a resistance $R_7$ which is variable from 0 to 20 K$\Omega$. The inverting input of the amplifier $OP_3$ is connected to ground through a resistor $R_8$ of 10 K$\Omega$, and to the output of the operational amplifier $OP_3$ through a resistor $R_9$ of 10 K$\Omega$ in series with a resistance $R_{10}$, which is variable from 0 to 10 K$\Omega$.

The output voltage of the operational amplifier $OP_3$ is the voltage $V_S$. The variable resistance $R_{10}$ is adjusted according to the gain required. The resistors $R_{15}$ and $R_4$ also enable the gains $K_1$ and $K_2$ to be adjusted. The resistor $R_7$ enables a gain to be adjusted before the adding stage. The resistor $R_{11}$ and the capacitor $C_3$ provide filtering for the battery voltage.

In another embodiment, instead of supplying the temperature sensor module 4 at 18 volts, which makes it necessary to make use of two 9 volt batteries, the module 4 is supplied with power at 9 volts, and this enables the alternator and/or the battery to be used for supplying power to the temperature sensor. In this case, the nominal voltage $V_S$ which is held constant by the regulator is halved as compared to the value mentioned in the foregoing description, that is to say it is of the order of 7 volts. In order to achieve this, it is only necessary to make appropriate modifications in the values of the resistances of the variable resistors in the module 4, and to use a reference value divided by two in the regulator 3.

In a further modification, instead of dividing the power supply voltage for the module 4 by two, it may also be divided (as may be the other variables) by some other value in the range between 1 and 10.

It is of course possible, within the scope of the invention, to envisage versions other than those already described. In particular, other types of thermal compensation may be provided in the temperature sensor module.

Again, the module 4 may include means for inhibiting the regulator when the battery voltage exceeds a given threshold value, for example 16 volts. Moreover, the regulator 3 can also have a secondary input which is connected to the battery through the ignition switch of the vehicle, and be provided with a telltale lamp, this arrangement being such as to enable the battery voltage to be regulated in a downgraded mode by the regulator 3 in the event of faulty input of the voltage $V_S$.

In the various embodiments described above, the module 4 is constructed with analog-type components. However, it will of course be understood that the module may consist of digital microprocessors, with the connection between the module 4 and the regulator 3 being in this case obtained with the aid of a data bus.

What is claimed is:

1. A power supply system for an on-board electrical network of a vehicle, comprising:
    a battery;
    a sensor for measuring a temperature of the battery;
    a sensing module, connected to the sensor, for generating an output voltage which is a function of the battery temperature and a battery voltage;
    an alternator for supplying power to the electrical network and charging the battery; and
    a regulator, associated with the alternator, for regulating the excitation of the alternator in such a way that the output voltage of the sensing module is maintained substantially at a voltage level that does not change its value when the battery temperature changes.

2. A system according to claim 1, wherein the output voltage of the sensing module corresponds to a linear combination of the battery voltage and the output voltage of the sensor.

3. A system according to claim 2, wherein the sensing module further includes:
    a first amplifier stage, connected to the output of the sensor, for receiving the output voltage from the sensor;
    a second amplifier stage, connected to the battery, for receiving the battery voltage from the battery; and
    an adder stage, connected to the first and second amplifier stages, for receiving an output voltage from the first amplifier stage and an output voltage from the second amplifier stage.

4. A system according to claim 2, wherein the sensing module provides an output voltage which increases in a linear manner as a function of the temperature between two threshold voltage.

5. A system according to claim 4, wherein the sensing module delivers a current from a current source, the sensing module including a resistive branch connected between the current source and ground, the output voltage of the sensor circuit corresponding to a voltage across the branch.

6. A system to claim 5, wherein the branch includes a variable resistance for adjusting the slope of variation in the output voltage of the sensing module as a function of a plurality of temperatures.

7. A system according to claim 5, wherein the sensing module further includes a first Zener diode defining an upper value of one of the threshold voltages, the first Zener diode being connected in parallel to the resistive branch.

8. A system according to claim 7, further comprising a second Zener diode defining a lower value of one of the threshold voltages.

9. A system according to claim 1, wherein the sensing module is connected to the alternator and the reference voltage level is approximately equal to the mean value of the battery voltage divided by a factor in the range between 1 and 10.

10. A system according to claim 1 wherein the sensing module further includes an interrupter for inhibiting the regulator when the battery voltage exceeds a predetermined threshold value.

11. A system according to claim 1, wherein the regulator includes an input connected to the battery for enabling the battery voltage to be regulated in a downgraded mode when the module is faulty.

12. A system according to claim 1, wherein the temperature sensor is connected to the battery and the reference voltage level is approximately equal to the mean value of the battery voltage divided by a factor in the range between 1 and 10.

13. A system according to claim 5, wherein the current increases linearly as a function of temperature.

14. A system according to claim 8, wherein an amplifier is connected between the output of the sensor and the first amplifier stage.

15. A system according to claim 14, wherein the second Zener diode is connected between the amplifier and the first amplifier stage.

16. A system according to claim 7, wherein a capacitance branch is connected in parallel to the resistive branch for filtering the output of the sensor.

17. A power supply system for an on-board electrical network of a vehicle, comprising:
    a battery;
    means for measuring a temperature of the battery;
    means, connected to said means for measuring, for generating an output voltage which is a function of the battery temperature and a battery voltage;
    means for supplying power to the electrical network and charging the battery; and
    means, associated with the alternator, for regulating the excitation of the means for supplying power in such a way that the output voltage of the means for generating of an output voltage is maintained substantially at a voltage level that does not change its value when the battery temperature changes.

18. A power supply system for an on-board electrical network of a vehicle having a battery, comprising:
    a sensing module to generate an output voltage which is a function of a battery temperature and voltage of the battery;
    an alternator for supplying power to the electrical network and charging the battery; and
    a regulator, associated with the alternator, for regulating the excitation of the alternator in such a way that the output voltage of the sensing module is maintained substantially at a voltage level that does not change its value when the battery temperature changes.

* * * * *